United States Patent [19]

Dubois

[11] Patent Number: 4,930,247
[45] Date of Patent: Jun. 5, 1990

[54] FISHING LURE SPINNER BLADE WITH RATTLE CHAMBER

[75] Inventor: Eugene Dubois, Baker, La.

[73] Assignee: Bass Pro Shops, Inc., Springfield, Mo.

[21] Appl. No.: 374,746

[22] Filed: Jul. 3, 1989

[51] Int. Cl.⁵ ............................................. A01K 85/00
[52] U.S. Cl. ................................................. 43/42.31
[58] Field of Search ...................................... 43/42.31

[56] References Cited

U.S. PATENT DOCUMENTS

| | | | |
|---|---|---|---|
| 4,619,068 | 10/1986 | Wozawa | 43/42.31 |
| 4,745,700 | 5/1988 | Davis | 43/42.31 |
| 4,793,089 | 12/1988 | Long et al. | 43/42.31 |
| 4,823,497 | 4/1989 | Pierce | 43/42.31 |

Primary Examiner—M. Jordan

[57] ABSTRACT

A spinner type fishing lure having a metal spinner blade with a built-in rattle chamber and a metal pellet in the chamber for producing a rattling sound attractive to fish. The rattle chamber is formed by a hemispherical dome on the spinner blade and a flat base plate extending across the bottom of the dome. The combination of the domed shape of the rattle chamber and metal surfaces which bound it generates a rattling sound that is especially effective in attracting fish.

5 Claims, 1 Drawing Sheet

FISHING LURE SPINNER BLADE WITH RATTLE CHAMBER

BACKGROUND AND SUMMARY OF THE INVENTION

This invention relates generally to artificial fishing lures and more particularly to a spinner type lure having a metal blade with a built in rattle chamber.

Spinner type fishing lures have been popular for a number of years. Typically, the spinner lure includes a lure body which carries the hook and a spinner blade which spins in the water in order to attract fish. The lure body and spinner blade are normally connected by a wire type harness which has a swivel connection with the spinner blade to permit it to spin.

The present invention is directed to a spinner type lure which is specially constructed to emit a distinctive rattling sound which is highly attractive to fish. In accordance with the invention, a spinner lure is conventional for the most part but includes a specially constructed metal blade having a built-in rattle chamber that carries a metal pellet. The rattle chamber is hemispherically shaped and is formed by a dome on the blade and a flat base plate that extends across the bottom of the dome to enclose the pellet. This configuration provides a dome side and a flat side for the rattle chamber. The hemispherical shape of the rattle chamber and the provision of metal surfaces around it for the metal pellet to rattle against cooperate to provide a sound that is particularly effective in attracting fish.

DESCRIPTION OF THE DRAWING

In the accompanying drawing which forms a part of the specification and is to be read in conjunction therewith and in which like reference numerals are used to indicate like parts in the various views.

DETAILED DESCRIPTION OF THE INVENTION

Figure 1:
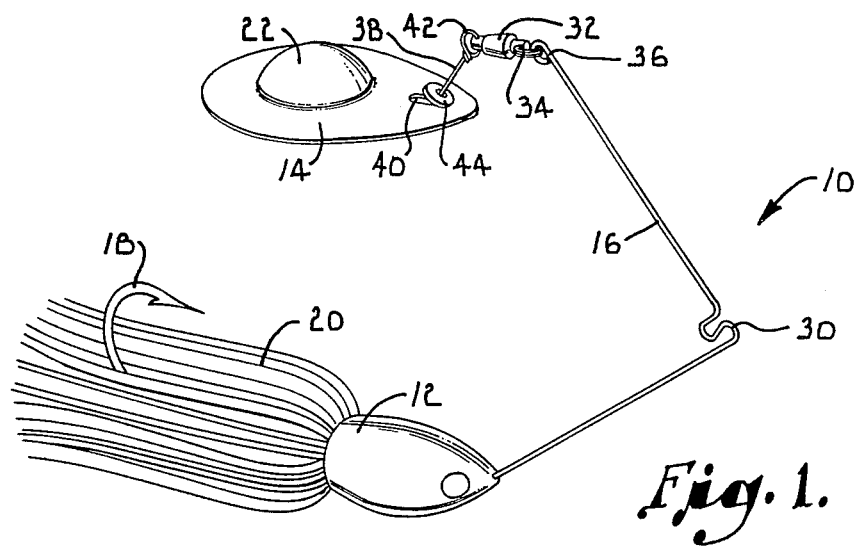
FIG. 1 is a perspective view of a spinner type fishing lure that is equipped with a special metal spinner blade in accordance with a preferred embodiment of the present invention.
Figure 2:
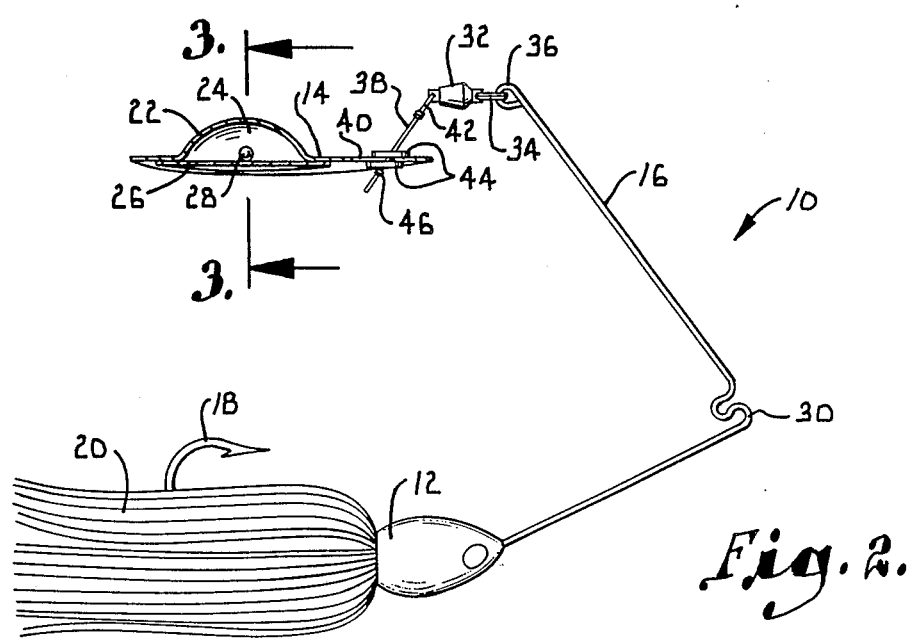
FIG. 2 is a side elevational view of the lure shown in FIG. 1, with the spinner blade shown in section.
Figure 3:
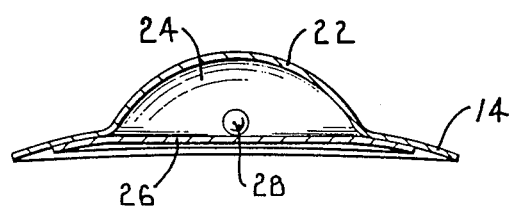
FIG. 3 is a fragmentary sectional view on an enlarged scale taken generally along line 3—3 of FIG. 2 in the direction of the arrows.

In accordance with the present invention, a spinner type artificial fishing lure, generally identified by reference numeral 10, includes a lure body 12, a spinner blade 14, and a wire harness 16 which connects the lure body 12 with the spinner blade 14. The lure body 12 carries a barbed fish hook 18 which may be generally surrounded by a skirt 20 that extends from the head of the lure body 12.

The spinner blade 14 is specially constructed such that a distinctive and attractive rattling sound is generated as it moves in the water. The blade 14 is made wholly of metal and has a generally oval configuration. The blade 14 is generally flat for the most part and has a dome 22 near its center which presents an internal rattle chamber 24 that is built into the blade 14. The bottom of the rattle chamber 24 is covered by a flat base plate 26 which is preferably constructed of the same metal as the blade 14.

The base plate 26 may be glued or otherwise suitably secured to the blade 14. The dome 22 presents a hemispherical shape so that the rattle chamber 24 which is built into blade 14 is likewise hemispherical. It is also noted that the rattle chamber 24 is bounded solely by the metal surfaces of the dome 22 and the base plate 26.

A metal pellet 28 is received loosely in the rattle chamber 24 so that it can rattle against the metal surfaces which form the boundaries of the rattle chamber. Preferably, the pellet 28 is a round steel pellet which may be a common birdshot pellet.

It is contemplated that the hemispherical dome 22 could be used as a separate and distinct sound producing device capable of an associated use with many types of fishing lures.

As previously indicated, the harness 16 connects the lure body 12 and the spinner blade 14. The harness 16 is a generally L-shaped wire having a bent portion 30 near the junction between its two legs. A fishing line (not shown) may be tied onto the bent portion 30 such that the blade 14 and lure body 12 are located one above the other as the lure moves in the water.

A special connection is provided between the harness 16 and the metal blade 14. The connection includes a conventional swivel 32 having a ring 34 on one end fitting through an eye 36 on the end of the harness 16. A wire 38 is threaded through a slot 40 in the metal spinner blade 14. An eye 42 on one end of wire 38 extends through an opening in one end of the swivel 32. A pair of collars or bushings 44 are fitted loosely around the wire 38 on opposite sides of the blade 14. A stop 46 on the wire 38 holds bushing 44 on the wire.

This type of connection allows the spinner blade 14 to spin on the wire 38, and it also allows the blade to swivel about the axis of the swivel 32. In addition, the blade 14 can move back and forth to a limited extent relative to the wire 38 due to the elongated configuration of the slot 40. By utilizing this type of connection, the rattling sound caused by the pellet 28 rattling around in the rattle chamber 24 is enhanced. An alternative connection is a split ring (not shown) extended through slot 40 and attached to one end of swivel 32.

In use, the lure 10 is tied on a fishing line in the usual manner, and the spinner blade 14 spins in the normal manner to attract fish which strike on the lure body 12 and hook 18. As the lure moves in the water, the spinning of the metal blade causes the pellet 28 to rattle around in the hemispherical rattle chamber 24 and rattle against the metal surfaces of the dome 22 and the base plate 26. This rattling sound is highly attractive to fish and is more effective in attracting fish than in the absence of a rattle device. The rattle chamber 24 is built into the spinner blade 14 and permits a simple construction of the rattle device. At the same time, the hemispherical shape of the rattle chamber 24 and the use of metal boundary surfaces and a metal pellet 28 cooperate to generate a rattling sound that is particularly attractive to fish. Because of the dome 22 on one side of the rattle chamber and the flat plate 26 on the other side, a distinctive rattling sound is emitted that is not achieved by other shapes such as a spherical shape.

The special blade 14 may be used with various types of lures, and it may be connected with the lure in various ways other than by means of the harness.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A fishing lure comprising:
  a lure body having a fishhook associated therewith;
  a metal blade presenting therein a hollow rattle chamber having a generally hemispherical shape, said blade having a generally hemispherical dome and a base plate cooperating to define said rattle chamber;
  a harness connecting said lure body and blade, said harness having means for receiving a fishing line on which the lure body and blade are to be carried; and
  a metal pellet in said rattle chamber fitting loosely therein to rattle against said blade for generating a rattling sound when the lure body and blade move in the water;

2. In a fishing lure having a lure body carrying a hook, a blade and a means for connecting the lure body and blade, the improvement comprising:
  means for providing a generally hemispherical rattle chamber on said blade, said rattle chamber being bounded by metal surfaces including a generally hemispherically dome and a base plate; and
  a metal pellet received loosely in said rattle chamber to rattle against said metal surfaces when the blade is agitated, thereby generating a rattling sound when the blade and lure body move in the water.

3. A fishing lure comprising:
  a lure body having a fishhook associated therewith;
  a blade presenting a generally hemispherical rattle chamber therein surrounded by metal surfaces including a generally hemispherically dome and a base plate;
  means for connecting said lure body with said blade; and
  a metal pellet loosely received in said rattle chamber to rattle against said metal surfaces for generating a rattling sound when the lure body and blade move in the water.

4. A noise maker for use with a fishing lure, said noise maker comprising:
  a hollow rattle chamber of generally hemispherical shape;
  a pellet in said rattle chamber fitting loosely therein and capable of generating a rattling sound when the lure moves in the water; and
  said chamber being constructed of a dome of generally hemispherically shape with a base plate cooperating with said dome to define said rattle chamber.

5. The combination of claim 4 wherein said dome and said base plate are metal.

* * * * *